United States Patent
Astier

(10) Patent No.: US 10,046,533 B2
(45) Date of Patent: Aug. 14, 2018

(54) METHOD FOR RETREADING A VEHICLE TIRE CASING AND VEHICLE CASING OBTAINED BY THIS METHOD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Cedric Astier, Clermont-ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 80 days.

(21) Appl. No.: 14/651,799

(22) PCT Filed: Dec. 11, 2013

(86) PCT No.: PCT/FR2013/053024
§ 371 (c)(1),
(2) Date: Jun. 12, 2015

(87) PCT Pub. No.: WO2014/091149
PCT Pub. Date: Jun. 19, 2014

(65) Prior Publication Data
US 2015/0314544 A1  Nov. 5, 2015

(30) Foreign Application Priority Data
Dec. 13, 2012 (FR) ................................. 12 62021

(51) Int. Cl.
*B29D 30/54* (2006.01)
*B29D 30/56* (2006.01)

(52) U.S. Cl.
CPC .............. *B29D 30/54* (2013.01); *B29D 30/56* (2013.01); *B29D 2030/541* (2013.01); *B29D 2030/548* (2013.01); *Y10T 156/1126* (2015.01)

(58) Field of Classification Search
CPC ........ B29D 30/52; B29D 30/54; B29D 30/56; B29D 2030/548; Y10T 156/1126;
(Continued)

(56) References Cited

U.S. PATENT DOCUMENTS 1,869,680 A     8/1932   Freeman
2,132,324 A *  10/1938   Schrank ............. B29D 30/2607
                                                                15/406
(Continued)

FOREIGN PATENT DOCUMENTS

CA        2149270    *  6/1996   ............. B29D 30/56
CN     102026828 A      4/2011
(Continued)

OTHER PUBLICATIONS

Machine generated English language translation of JP 10-193472 (original document dated Jul. 1998).*
(Continued)

*Primary Examiner* — Martin K Rogers
(74) *Attorney, Agent, or Firm* — Dickinson Wright PLLC

(57) ABSTRACT

In the method for retreading a vehicle tire casing, a fluid is injected into a casing between a tread and a tread backing in order to space them apart.

12 Claims, 3 Drawing Sheets

(58) Field of Classification Search
CPC ......... Y10T 156/1137; Y10T 156/1928; Y10T 156/1939; Y10S 156/928; Y10S 156/939
See application file for complete search history.

(56) References Cited

U.S. PATENT DOCUMENTS

| | | | | |
|---|---|---|---|---|
| 2,370,958 | A | * | 3/1945 | Hellier .................... B29C 73/02 156/249 |
| 2,609,026 | A | * | 9/1952 | Luchsinger-Caballero B60C 11/02 152/153 |
| 3,002,549 | A | | 10/1961 | Boussu |
| 4,733,705 | A | * | 3/1988 | Dwiggins ............... B60C 11/02 152/175 |
| 4,857,122 | A | | 8/1989 | Majerus |
| 2011/0056603 | A1 | * | 3/2011 | Koutoku ................ B29D 30/52 152/450 |
| 2013/0199704 | A1 | * | 8/2013 | Damon .................. B29D 30/08 156/110.1 |
| 2015/0214088 | A1 | * | 7/2015 | Nakao ............... H01L 21/67132 156/707 |

FOREIGN PATENT DOCUMENTS

| | | | | |
|---|---|---|---|---|
| DE | 2900425 | * | 10/1980 | ............... B29H 5/06 |
| DE | 19539699 | * | 4/1997 | ............ H01L 31/18 |
| JP | H08216289 A | | 8/1996 | |
| JP | H09207241 A | | 8/1997 | |
| JP | 10-193472 | * | 7/1998 | ............ B29D 30/08 |
| JP | 2000-301627 | * | 10/2000 | ............ B29D 30/52 |
| JP | 2003237310 | | 8/2003 | |
| WO | WO 2012/029402 | * | 3/2012 | ............. H01L 21/67 |
| WO | WO 2012/044160 | * | 4/2012 | ............. H01L 21/00 |

OTHER PUBLICATIONS

Machine generated English language translation of JP 2000-301627 (original document dated Oct. 2000).*
Machine generated English language translation of DE 19539699 (original document dated Apr. 1997).*
English langage Abstract for DE 2900425 (original document dated Oct. 1980).*
Written Opinion of the International Search Authority PCT/FR2013/053024 dated Jun. 12, 2015.

* cited by examiner

METHOD FOR RETREADING A VEHICLE TIRE CASING AND VEHICLE CASING OBTAINED BY THIS METHOD

This application is a 371 national phase entry of PCT/FR2013/053024, filed 11 Dec. 2012, which claims benefit of French Patent Application No. 1262021, filed 13 Dec. 2012, the entire contents of which are incorporated herein by reference for all purposes.

BACKGROUND

1. Field

The disclosure relates to the retreading of vehicle tires.

2. Description of Related Art

The operation of retreading conventionally consists in removing the worn tread from a tire casing in order to replace it with a new tread.

Thus, for heavy goods vehicle tires, the worn tread is removed by machining it so as to obtain, on the carcass of the casing, a surface state that is favourable for the deposition of a layer of bonding gum followed by a new tread.

It is also known to provide the tire with a hot-melt layer that bonds the tread to the carcass. For the purpose of retreading, this layer is heated in order to soften it, thereby making it possible to remove the tread.

SUMMARY

It is an aim of an embodiment of the invention to make it easier to remove the tread without damaging the rest of the tire.

To this end, provision is made according to an embodiment of the invention of a method for retreading a vehicle tire casing, wherein a fluid is injected into a casing between a tread and a tread backing in order to space them apart.

Thus, this injection makes it possible to create a separation initiator between the tread and the carcass without risking damage to the latter or even the tread. It is then possible to easily separate them by pulling on the tread. For this purpose, an incision can be made between the tread and the carcass as far as the fluid enclosure or else a fluid pressure that is sufficient to rupture the seal at the joint between the tread and the carcass can be applied. The integrity of the carcass is thus preserved in order that it can receive a new tread under good conditions. Moreover, since the tread itself has not been damaged, if it has no or moderate wear, it can be reused for example on another carcass.

In one embodiment, prior to the injection, a layer of the casing is softened.

Following this softening, which may be carried out by induction heating, the fluid is injected into the softened layer.

In another embodiment, the method is applied to a casing comprising a layer that is located between the tread and the backing and is able to inflate in order to form an enclosure in a wall of the casing.

Advantageously, the fluid is a gas, in particular air.

However, provision can be made for the fluid to be a liquid.

Preferably, the injection is carried out through the tread.

Advantageously, an injection needle is passed into the thickness of a wall of the casing, the needle having pressurized fluid at its free end orifice as it is passed in.

Thus, by applying the fluid pressure as soon as the needle starts to penetrate into the wall, it is ensured that the injection of fluid starts when the tip of the needle reaches a layer that is able to receive this fluid. It is thus not necessary to calculate exactly the depth to which the needle is to penetrate and to start the injection when this depth is achieved. This thus makes it easier to implement the method.

Advantageously, the injection is carried out so as to form a fluid enclosure having a width greater than half the width of the tread measured in the direction of a main axis of the casing.

Preferably, the injection is carried out so as to form a fluid enclosure extending as far as lateral edges of the tread.

Preferably, the injection is carried out so as to form a fluid enclosure extending through one complete turn about a main axis of the casing.

With these different features, the fluid is used not only to create a separation initiator but also to space apart the tread and the carcass as much as possible in order to make it easier to completely separate them.

Advantageously, the method is applied to a casing comprising an edge gum having a region of reduced thickness compared with the rest of the edge gum, this region being located in line with a layer that is located between the tread and the backing and is able to inflate in order to form an enclosure in a wall of the casing.

This initiator makes it easier to insert a tool for separating the tread and the carcass. It may also promote their separation by rupturing the gum under the effect of the pressure of the fluid.

Preferably, prior to the injection, a joint of the tread to at least one sidewall of the casing is covered with a fluid-tight layer.

Thus, rupturing of the gum at this joint is avoided in order to promote the creation of an extended enclosure which makes it even easier to separate the tread and the carcass.

In one embodiment, the tread has a level of wear that is incompatible with this tread being used again as such for rolling under predetermined conditions.

This is the situation in which it is desired to replace a worn tread with a new tread.

Provision can be made to destroy the tread.

In another embodiment, the tread has a level of wear that is compatible with this tread being used again as such for rolling under predetermined conditions.

In this situation, the tread which is separated from the carcass may be reused for example on another carcass or later on the same carcass. The first carcass may receive a tread of a different type. It is thus possible to replace a tread intended for winter with a tread intended for summer and vice versa.

Advantageously, the tread is mounted on a carcass of another tire casing.

Provision is also made according to the invention of a vehicle tire casing which has been subjected to retreading by way of a method according to the invention.

Finally, provision is made according to an embodiment of the invention of a vehicle tire casing which comprises a tread that results from the application of a method according to the invention to another tire casing.

BRIEF DESCRIPTION OF DRAWINGS

One embodiment of the invention and variants thereof will now be presented with reference to the appended drawings, in which.

DETAILED DESCRIPTION OF SPECIFIC EMBODIMENTS

One embodiment of the method of the invention will now be described with reference to FIGS. 1 to 4. This method is applied to a wheel tire casing. The wheel may be a wheel of a vehicle of the light type, of a utility vehicle, of a vehicle of the heavy goods type or, alternatively, of a civil engineering vehicle.

Figure 5:
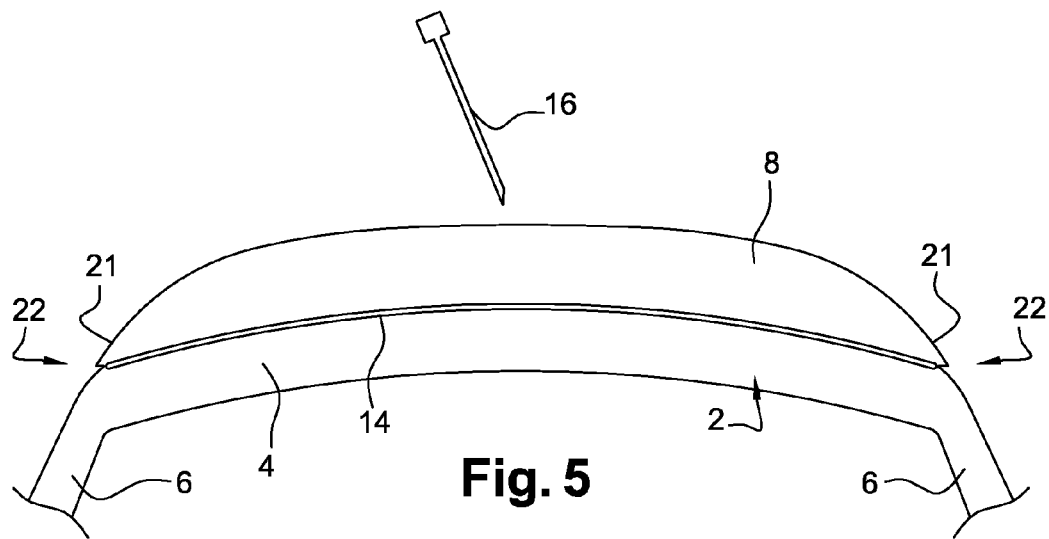
FIGS. 5 and 6 are views similar to FIGS. 1 to 4 illustrating a variant embodiment of the method.

The casing 2 comprises a carcass 4 having a main part with a shape similar to that of a cylinder and two lateral sidewalls 6 that are visible in particular in FIG. 5. The casing also comprises a tread 8 that is borne by the carcass on the side of the latter that is furthest away from the main axis 10 of the casing. The tread originally has tread patterns on its external face 12 but these may have partially or completely disappeared depending on the level of wear of the tread.

The casing comprises an interface layer 14 interposed in the radial direction with respect to the axis 10 between the carcass 4 and the tread 8. In this case, the layer is a layer made of a thermoplastic material that is able to soften when it is subjected to heating. In addition, this layer may be inflated by fluid injection, as will be seen below. In the present example, the layer 14 extends across the entire width of the tread and around the entire circumference of the casing.

Provision is made of means for injecting a pressurized fluid that is formed in this case by air. These means comprise in particular a needle 16 that is connected in a suitable manner, which has not been illustrated in detail, to a source of air and to pumping means for pressurizing the air in the needle. The needle 16 has at its free end an orifice 18 through which the pressurized air can escape. The needle is for example a hypodermic needle, the free end of which is bevelled.

In a first step of the method, the layer 14 is softened, for example by heating it. To this end, use can be made in particular of induction heating means which cooperate with metal elements of the casing in order to produce the heat therein.

Figure 1:
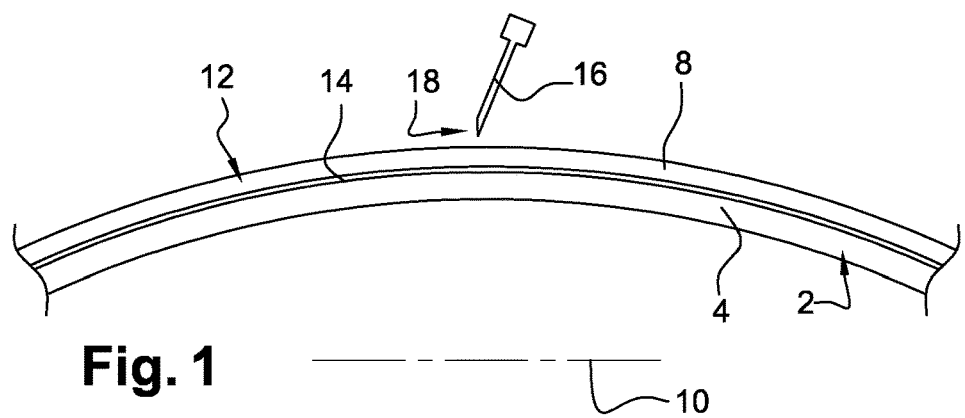
FIGS. 1, 2, 3, and 4 illustrate, in sectional views of a part of a tire casing, four successive steps in the implementation of the method of the invention.

Next, with reference to FIG. 1, the compressed air in the needle is injected before the latter is in contact with the casing, the air then escaping through the free end of the needle.

Figure 2:
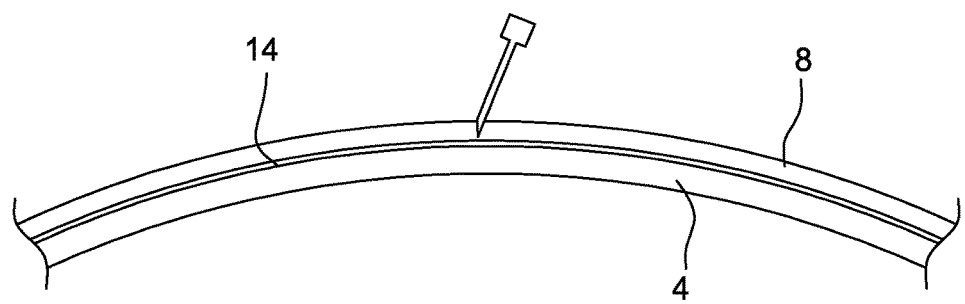

With reference to FIG. 2, the needle is passed into the casing from the external face 12 of the tread, and it is passed through the thickness of the tread in the direction of the axis 10 and of the carcass 4. Before the orifice 18 reaches the layer 14, the rubber of the tread blocks this orifice and prevents the outlet of the compressed air.

Figure 3:
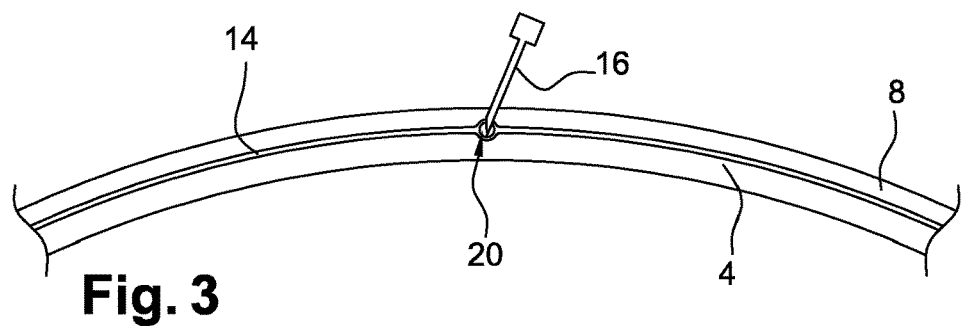

With reference to FIG. 3, it is only when the tip of the needle reaches the layer 14 that the air can escape into this layer and be injected into the latter. The inflation of the layer 14 creates a bubble and then an enclosure or pocket which prevents the tip of the needle 16 from coming into contact with the carcass 4, thereby ensuring that the latter is not damaged. The progression of the needle in the radial direction is stopped at this stage. The enclosure 20 is formed entirely within the layer 14. The tread extends above the enclosure and the carcass beneath it. Thus, compressed air is injected through the tread between the tread and the carcass in order to space them apart.

Figure 4:
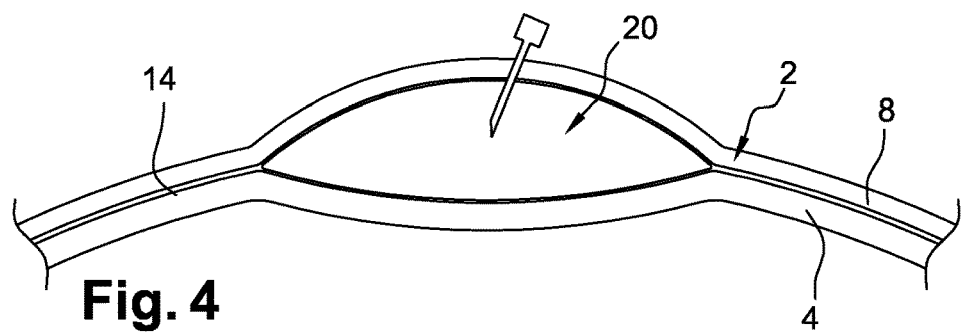

With reference to FIG. 4, injection is continued until the enclosure 20 has been given a substantial size, for example a width greater than half the width of the tread measured in the direction of the axis 10.

In a subsequent step that is not illustrated, the tread and the carcass are separated by grasping the tread by way of its part that is contiguous with the enclosure 20. To this end, it is possible to cut the tread by means of a tool for gripping it. It is also possible to grip it without cutting it first. Thus, the tread is separated entirely from the rest of the casing by peeling.

Next, a bonding layer is installed on the carcass at the location left free by the previous tread 8, and then a new tread is installed on top of said bonding layer.

Figure 6:
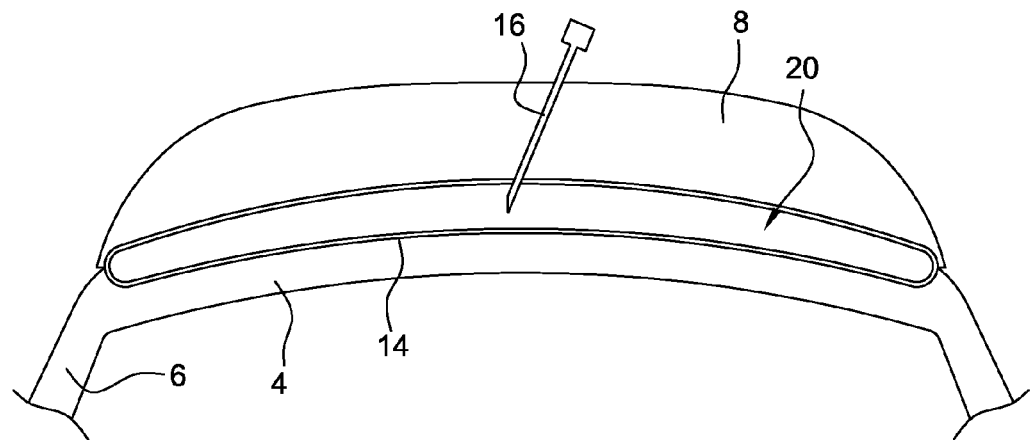

In order to make it easier to separate the tread and the carcass, it may be advantageous to further increase the volume of the enclosure 20. This is the case in the variant of the method illustrated in FIGS. 5 and 6. In this variant, as illustrated in FIG. 6, injection is continued until the enclosure 20 has a width in the direction of the axis 10 that is equal to that of the tread or close to this width and until the enclosure extends as far as the lateral edges thereof. Moreover, injection is continued until the enclosure 20 has been given a circumferential form that extends through one complete turn about the axis 10.

This variant is applied here to a casing having an edge gum 21. This is an external edge gum which continuously bonds each sidewall 6 to the tread 8 on each side by covering the layer 14, the latter thus not being visible at the surface of the casing.

In addition, the casing has been manufactured such that the edge gum has, in line with the layer 14, a region of reduced thickness compared with the rest of the edge gum.

Provision can thus be made for this region to be able to rupture when the pressure in the pocket reaches a predetermined value. Consequently, the injection of compressed air into the pocket can be continued until a pressure sufficient to rupture this thinner region at least on one side of the casing has been reached. It is thus easy to finish complete separation of the tread from the carcass, without damaging it and with its contours being controlled.

Provision can also be made for this region to be easily cut by means of a tool for separating the tread and the carcass.

Figure 7:
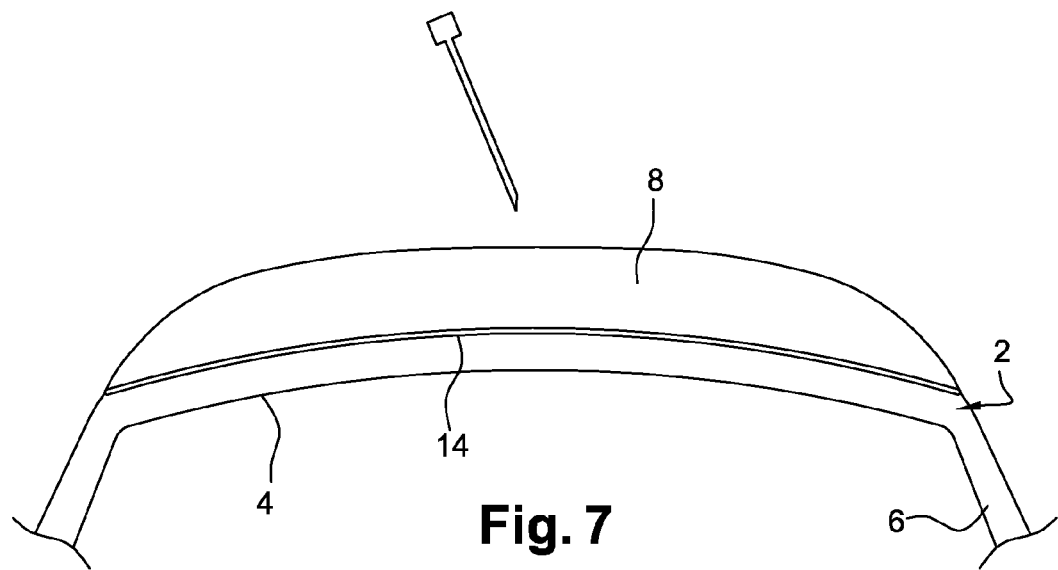
FIGS. 7 and 8 are views similar to FIGS. 5 and 6 illustrating another variant embodiment of the method.
Figure 8:
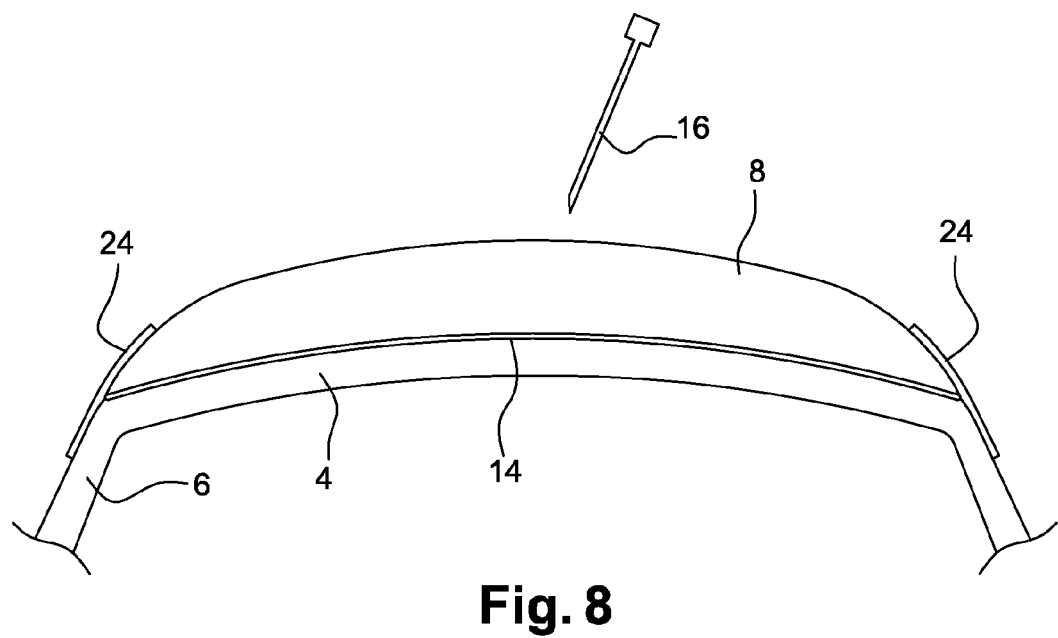

The same type of method can be implemented if the casing does not comprise edge gum, as is the case in the variant which will now be described. In such a casing, which is illustrated in FIG. 7, the edges of the layer 14 are visible at the surface of the casing. In order to avoid rupturing of this layer during the injection of compressed air in accordance with the variant in FIGS. 5 and 6, a region that joins the tread to sidewalls of the casing is covered with an airtight layer 24, as illustrated in FIG. 8. The layer 24 is formed for example by adhesive strip made of a suitable material. Use can also be made of a tool that is able to press the edges of the tread against the sidewalls of the tire. It is thus possible, as before, to inject compressed air so as to create an enclosure 20 that extends as far as the lateral edges of the layer 14 without fearing premature rupturing thereof. Once the enclosure has reached the desired volume, all that is necessary is to remove the layers 24 in order to separate the tread and the carcass. Once again, the tread is not damaged.

The method according to an embodiment of the invention can be implemented in order to replace a worn tread of a casing with a new tread or at the very least a tread that is able to be used again as such for rolling under predetermined conditions.

However, if the tread which has just been removed is still able to be used as such for rolling under predetermined conditions, it can be employed to retread a carcass of another tire casing, or even, subsequently, to retread the same carcass when the new tread installed in the meantime has to be replaced.

The method of an embodiment of the invention can thus be implemented to replace a tread of a casing with a tread of another type while the first is still usable. It is thus possible to replace a tread that is favourable for driving in winter with a tread that is favourable for driving in summer, and vice versa. Similarly, it is possible to replace a tread that is suitable for a sporty type of driving with a tread that is suitable for a touring type of driving.

The method can thus be applied to a casing of which the tread has a level of wear that is incompatible with this tread being used again as such for rolling under predetermined conditions, or else to a casing of which the tread has a level of wear that is compatible with it being used again as such for rolling under predetermined conditions.

The predetermined conditions are the normal conditions of use of the vehicle in accordance with regulations, such that driving the vehicle does not pose an unnecessary risk to the occupants thereof.

In the first case, this means that the tread is sufficiently worn to not justify it being installed again on a carcass in order to be used for a certain period of time. It is for this reason that the tread is destroyed after the tread has been separated from the carcass.

In the second case, by contrast, wear is minimum or zero and justifies installing the tread on a carcass in order to be reused for a long period of time.

Of course, numerous modifications could be made to the invention without departing from the scope thereof.

The fluid injected could be a gas other than air. It could also be a liquid such as water.

Provision may be made for the fluid not to be injected into a layer that is able to inflate but rather at a mechanical interface of the casing which allows the latter to receive the pressurized fluid. This may be for example a layer with a particular roughness, a mechanical obstacle, or else two layers that are joined together in a removable manner in particular by way of touch-and-close type fasteners.

It is not necessary for the layer 14 which receives the pressurized fluid to extend across the entire width of the tread and around the entire circumference of the casing. All that is necessary is for it to extend locally at the point of injection in order to initiate the separation of the tread and the carcass.

The invention claimed is:

1. A method for retreading a vehicle tire casing, comprising the steps of:
    passing a needle, which has a free end orifice with a positively pressurized fluid, into a thickness of an external wall of the casing until the orifice reaches a location between a tread and a carcass,
    injecting the fluid into an interface layer, which is made of a thermoplastic material and which has been softened by heating, between the tread and the carcass to create a bubble in the interface layer which spaces the tread and the carcass apart and forms a fluid enclosure extending at least partially around a main axis of the casing, and then
    grasping a portion of the tread which is contiguous with the fluid enclosure and peeling the tread from the casing from the grasped portion of the tread to entirely separate the tread from the carcass.

2. The method according to claim 1, wherein the fluid is a gas.

3. The method according to claim 1, wherein the injection is carried out through the tread.

4. The method according to claim 1, wherein the injection is carried out so as to form the fluid enclosure having a width greater than half the width of the tread measured in the direction of the main axis of the casing.

5. The method according to claim 1, wherein the injection is carried out so as to form the fluid enclosure extending as far as lateral edges of the tread.

6. The method according to claim 1, wherein the injection is carried out until the fluid enclosure extends through one complete turn around the main axis of the casing.

7. The method according to claim 1, wherein the casing has an edge gum with a region of reduced thickness compared with the rest of the edge gum, this region being located in line with the interface layer.

8. The method according to claim 1, wherein, prior to the injection, a joint of the tread to at least one sidewall of the casing is covered with a fluid-tight layer.

9. The method according to claim 1, wherein the tread has a level of wear that is incompatible with this tread being used again as such for rolling under predetermined conditions.

10. The method according to claim 1, wherein the tread is destroyed.

11. The method according to claim 1, wherein the tread is mounted on a carcass of another tire casing.

12. The method according to claim 2, wherein the gas is air.

* * * * *